3,406,993
CORE LOCKED FERRULE
Theodore J. Haynes, P.O. Box 252,
Eagle Point, Oreg. 97524
Filed Mar. 8, 1965, Ser. No. 437,639
2 Claims. (Cl. 287—127)

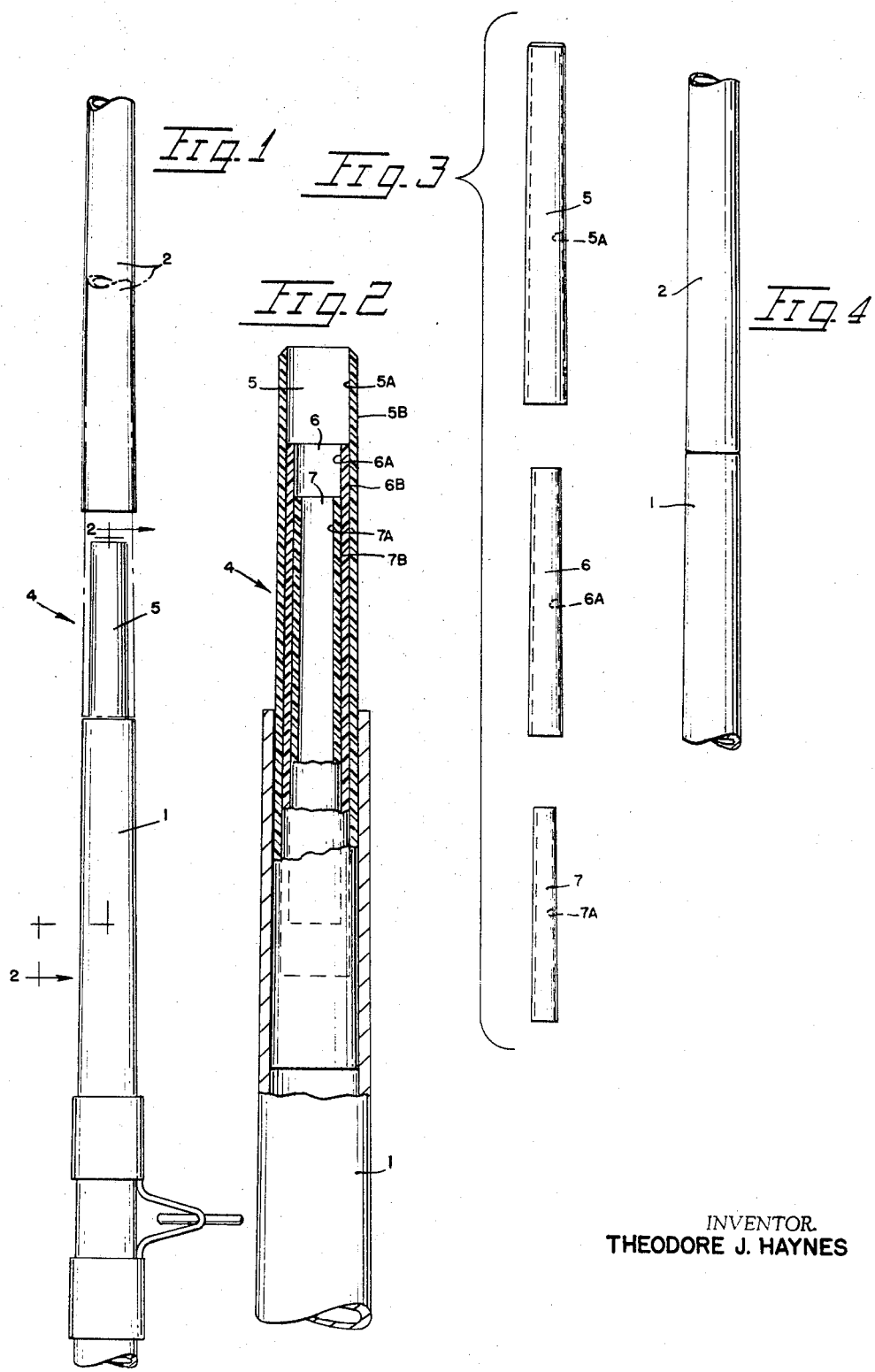

ABSTRACT OF THE DISCLOSURE

Ferrule means for joining tapered, tubular sections of a fishing rod wherein an elongated ferrule is correspondingly tapered to snugly engage the inner walls of said sections. A ferrule embodying this invention is permanently secured adjacent the end of one rod section and extends axially for reception of an adjacent section. Additionally, said ferrule means may be relieved internally for purposes of flexibility.

---

This invention relates to fishing rod construction and more particularly to novel ferrule means.

It is the object of the present invention to provide a ferrule that can be used in tubular fiberglass fishing rods without substantially restricting their flexibility or adding undesirable extra weight to the rod.

Another object of the present invention is to provide a ferrule that permits joining of two rod sections together in a firm, friction tight manner.

Still a further object of the present invention is to provide a core locked ferrule that is both strong and capable of flexing with its two adjacent rod sections.

Additional objects of this invention will become evident from a study of the following detailed description in conjunction with the accompanying drawing, in which:

FIGURE 1 is a view of adjacent rod sections and a ferrule made in accordance with the present invention.

FIGURE 2 is an enlarged sectional view taken along line 2—2 of FIGURE 1, showing interior of a core locked ferrule.

FIGURE 3 is a view of three separated ferrule components.

FIGURE 4 is a view of the joined rod sections.

Referring further to the drawing, a core locked ferrule indicated generally at 4 in FIGURE 1 includes tapered, tubular components 5, 6 and 7 concentrically nested and of varying lengths.

The components are preferably, though not restrictively, formed from material commercially marketed under the trademark Fiberglas. Ferrule component 5 has uniformly tapering inner and outer walls 5A and 5B, the latter being of a size to frictionally engage the inner periphery of the opposing end portions of the rod sections indicated at 1 and 2. Ferrule component 6 has uniformly tapering inner and outer walls 6A–6B with outer wall 6B corresponding in circumference to the inner wall 5A of component 5 to permit seating therewithin. In a similar manner component 7 has an inner wall 7A and an outer wall 7B, the latter being of a size to permit seated engagement within ferrule component 6.

With reference to FIGURE 3, the laminating of these components will be easily understood. Component 7 is coated with resin and inserted into component 6 whereupon component 6 is coated with resin and inserted into 5. As shown in FIGURE 2, the components 6 and 7 will assume a central forward location relative to component 5. Subsequently, the lower half of component 5 of the ferrule is then coated with a suitable adhesive preferably one having a resin base and inserted into the large end of rod section 1 for positioning at the opposite or smaller end of section 1 whereat it protrudes approximately one-half of its length. Any looseness of fit between the upper half of ferrule 4 and rod section 2 after a long period of use may be overcome by simply dressing off the lower end of section 2.

The operation of this core locked ferrule is believed readily apparent. Grasping the rod sections, they may be easily disengaged by pulling apart with a turn of the wrist.

While this invention has been described with particular reference to the construction shown in the drawing and while various changes may be made in the detail construction, it shall be understood that such changes shall be within the spirit and scope of the present invention as defined by the appended claims.

Having thus completely and fully described the invention, what is now claimed as new and desired to be protected by Letters Patent of the United States is:

1. A core locked ferrule comprising in combination concentric nested hollow tubular components made from hollow tubular fiberglass shafting laminated together into one core, said core being inserted into the large diameter end of a tapered tubular rod section, and secured in and protruding approximately one half of said core length from the small diameter end of said rod section as an integral part of said rod section to receive a second rod section.

2. A ferrule as claimed in claim 1 having a longitudinally extending opening of a non-constant diameter, said core locked ferrule having an external longitudinal taper and diameter corresponding to the adjacent inner walls of the rod sections.

References Cited

UNITED STATES PATENTS

| Re. 11,357 | 8/1893  | Latulip        | 43—18 XR  |
|------------|---------|----------------|-----------|
| 1,284,295  | 11/1918 | Frederick      | 43—18     |
| 1,325,612  | 12/1919 | Baum           | 285—332   |
| 1,778,164  | 10/1930 | Platter et al. | 43—18     |
| 2,052,713  | 9/1936  | Jutta          | 285—332   |
| 2,370,193  | 2/1945  | Reid           | 285—332   |
| 3,310,903  | 3/1967  | Binvignat      | 43—18     |
| 2,536,388  | 1/1951  | Murray         | 287—126 XR|
| 2,679,911  | 6/1954  | Bhend          | 287—2 XR  |
| 2,787,484  | 4/1957  | Macy           | 43—18 XR  |
| 3,152,820  | 10/1964 | Glampa et al.  | 43—18 XR  |

FOREIGN PATENTS

| 1,103,640 | 5/1955 | France.        |
| 490,718   | 8/1938 | Great Britain. |

CARL W. TOMLIN, Primary Examiner.

ANDREW KUNDRAT, Assistant Examiner.